United States Patent [19]

Reed et al.

[11] 4,431,457

[45] Feb. 14, 1984

[54] PROCESS FOR CLEANING METAL SURFACES OF POLY(ARYLENE SULFIDE) DEPOSITS

[75] Inventors: Jerry O. Reed; Guy Senatore, both of Bartlesville, Okla.

[73] Assignee: Phillips Petroleum Company, Bartlesville, Okla.

[21] Appl. No.: 393,240

[22] Filed: Jun. 29, 1982

[51] Int. Cl.³ .............................................. C23G 5/02
[52] U.S. Cl. ............................................ 134/2; 134/3
[58] Field of Search ................. 134/28, 30, 41, 38, 134/3, 2; 524/371; 252/544, 547

[56] References Cited

U.S. PATENT DOCUMENTS

| | | | |
|---|---|---|---|
| 3,003,970 | 10/1961 | Call | 252/152 |
| 3,476,599 | 11/1969 | Grover et al. | 134/4 |
| 3,637,508 | 1/1972 | Willsey et al. | 134/41 |

Primary Examiner—S. Leon Bashore, Jr.
Assistant Examiner—Karen M. Hastings

[57] ABSTRACT

A process for removing deposits on metal surfaces, derived from certain poly(arylene sulfide) polymers, is provided by contacting the metal surfaces with a polyamine containing compound under conditions suitable to remove said deposits on the metal surfaces.

9 Claims, No Drawings

PROCESS FOR CLEANING METAL SURFACES OF POLY(ARYLENE SULFIDE) DEPOSITS

This invention relates to a process for cleaning metal surfaces containing poly(arylene sulfide) based deposits.

In the production of poly(arylene sulfide) polymers various impurities such as polymer gel and inorganic materials are present in the polymer and can deposit on the surfaces of the production equipment. Materials derived from the polymer can also be formed during processing the produced polymer, such as in synthetic fiber production. Machine parts utilized in processing the produced polymer which contain poly(arylene sulfide) and impurities and which must be cleaned for re-use include spinnerettes, dies, pack parts, and filters.

Sometimes the poly(arylene sulfide) deposits may be removed mechanically, but the job is tedious and time consuming due to the complexity of the equipment. Also, the deposits can be removed by "burn out" procedures where the metal parts containing the deposits are placed in forced air furnaces and the extreme heat applied removes them. This "burn out" procedure will not work for cleaning all deposits from metal surfaces such as the specific case of poly(phenylene sulfide) based deposits. In this case, burn out will result in a metal surface which is corroded. Therefore, new processes which will readily remove the deposits without having a corrosive or other deleterious effect on processing equipment are therefore greatly desirable.

It is therefore an object of this invention to provide a process for removing deposits on metal surfaces derived from poly(arylene sulfides).

Other aspects, objects, and the several advantages of the present invention will become apparent from this specification and the claims.

In accordance with the present invention, it has been discovered that deposits on metal surfaces derived from a poly(arylene sulfide) polymer can be removed by contacting the metal surfaces with at least one polyamine compound, represented by the general formula

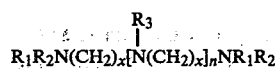

wherein $R_1$ and $R_2$ can be hydrogen or an alkyl radical having from 1 to 10 carbon atoms; $R_3$ can be hydrogen or an alkyl radical having 1 to 6 carbon atoms; x can be 1, 2, or 3; and n can be any integer from 1 to 4, at a temperature and for a time sufficient to remove said deposits from the surface of said metal.

Examples of polyamines suitable for use in the process of this invention include:
diethylenetriamine
triethylenetetramine
tetraethylenepentamine
N,N,N',N',N''-pentamethyldiethylenetriamine
N,N,N',N',N''-pentapropyldiethylenetriamine
N,N'-dimethyldiethylenetriamine
N,N',N''-triethyldiethylenetriamine
N,N,N',N',N'',N'''-hexamethyltriethylenetetramine
and mixtures thereof.

The term "poly(arylene sulfide) polymer" as used in this specification is intended to include polymers of the type which are prepared as described in U.S. Pat. No. 3,354,129 and U.S. Pat. No. 3,919,177. As disclosed in U.S. Pat. No. 3,354,129, these polymers can be prepared by reacting a polyhalo-substituted cyclic compound containing unsaturation between adjacent rings and an alkali metal sulfide in a polar organic compound. The resulting polymer contains the cyclic structure of the polyhalo-substituted compound coupled in repeating units through a sulfur atom. The polymers which are preferred for use in this invention, because of their frequent occurence in polymer production and processing, are those polymers having the repeating unit —R—S— where R is phenylene, biphenylene, naphthylene, biphenylene ether, or a lower alkyl-substituted derivative thereof. By "lower alkyl" is meant alkyl groups having one to six carbon atoms such as methyl, propyl, isobutyl, n-hexyl, etc. Polymer can also be made according to a process utilizing a p-dihalobenzene and an alkali metal sulfide, an organic amide, and an alkali metal carboxylate as in U.S. Pat. No. 3,919,177.

Suitable polyamines to be used as the cleaning agent should exhibit some solubility for the particular poly(arylene sulfide) polymer being removed. Such polyamine should preferably have a boiling point greater than about 200° C. as their use at such a temperature has exhibited enhanced cleaning results.

In carrying out the process of the present invention, the metal surfaces to be cleaned are contacted with the polyamine cleaning solution in any suitable manner and heated at a temperature and for a time sufficient to effect removal of the deposits for the metal surface. Generally, the metal surfaces should be contacted with the polyamine solution at a temperature above about 200° C. and preferably above about 250° C. for a period of time from about 0.5 hours to about 24 hours.

The cleaned metal surfaces are then removed from the bath and contacted with any solvent, such as methanol, which will remove any polyamine remaining on the surface of the metal. Then the metal surfaces are contacted with water, dried, and treated with concentrated HNO3 to remove any remaining contaminants on the metal surface.

In order to provide a clearer understanding of the present invention, but without limiting the scope thereof, the following examples are presented.

EXAMPLE I

Poly(phenylene sulfide) (PPS) having a melt flow between 200 and 400 as measured at 315° C./5 Kg (ASTM D-1238, Modified Procedure B) was extruded at about 300° C. through a screen-pack comprised of 4 metal screens (1.56 inches diameter) 40/80/200/Dynalloy X13L mesh size placed on top of one another. After several hours extrusion, the screens containing poly(phenylene sulfide) deposits were removed and immersed in 200 milliliters of triethylenetetramine and the solution heated at about 260° C. for 6 hours. The screens were removed from the hot amine solution and soaked in methanol at 25° C. for 1 hour to remove the amine. The screens were then water soaked at 25° C. for 1 hour, air dried and treated with concentrate HNO3 for about 30 minutes at 25° C. to remove any remaining deposits. Weighing the screen pack before and after cleaning revealed that about 85 weight percent of PPS-deposits were removed, indicating good cleaning. Repeating the process at 200° C. and 280° C. gave about 52 weight percent and 99 weight percent, respectively of PPS-contaminants removal.

The process was repeated using a glycol and two hydroxy amines to determine their efficiency as a cleaner. None of the liquids tested were satisfactory in removing PPS-deposits from metals. These results along with that of a commercial cleaner are listed in Table I. The results from the triethylenetetramine cleaning are also listed for comparison.

| Run No. | Cleaner | Conditions °C. | Hours | Results |
|---|---|---|---|---|
| Controls: | | | | |
| 1 | Triethylene Glycol | 250 | 4 | No cleaning |
| 2 | Triethanolamine | 250 | 6 | No cleaning |
| 3 | Ethanolamine | 170 | 6 | No cleaning |
| 4 | Depoxy[a] | 125 | 4 | No cleaning |
| Invention: | | | | |
| 5 | Triethylenetetramine | 200 | 6 | 52% removal |
| 6 | Triethylenetetramine | 260 | 6 | 85% removal |
| 7 | Triethylenetetramine | 280 | 2 | 99% removal |

[a]Commercial cleaner from Atomergic Chemetals Corp., Plainville, NY; 90% dimethylsulfoxide, 7% HNO₃, stabilizers and accelerators.

EXAMPLE II

Poly(phenylene sulfide) (PPS) as described in Example I was extruded at about 300° C. through a filter cartridge commonly used in fiber spinning operations. This filter cartridge identified as Dynalloy X13L consisted of a 7.5 inches×1.55 inches O.D. cylinder with an inner and outer stainless steel support screen (equivalent to about a 40 mesh size) and an inner fine filter stainless steel mat (46 micron filter rating). After several hours operation, the filter cartridge was removed, soaked in triethylenetetramine at 250° C. for 16 hours and further cleaned by soaking them in methanol at 25° C. for 1 hour. The metal surfaces were then soaked in water at 25° C. for 1 hour, air dried, and treated with concentrated HNO₃ for about 30 minutes at 25° C. By this method, greater than 95 percent of residual PPS-deposits was removed from the cartridge filter indicating good cleaning. This example illustrates the usefulness of the instant invention in cleaning other type metal filter screen systems.

We claim:

1. A process for removing deposits on metal surfaces derived from poly(arylene sulfide) compound consisting essentially of contacting said metal surface with at least one polyamine compound represented by the general formula

$$R_1R_2N(CH_2)_x[N(CH_2)_x]_nNR_1R_2$$

wherein $R_1$ and $R_2$ can be hydrogen or any alkyl radical having from 1 to 10 carbon atoms; $R_3$ can be hydrogen or any alkyl radical having 1 to 6 carbon atoms; x can be 1, 2, or 3, and n can be any integer from 1 to 4, at a temperature and for a time sufficient to remove said deposits from the surface of said metal.

2. A process according to claim 1 wherein said metal surface is further treated by contacting the resulting metal surface with methanol and then water; (b) drying said metal surface; and (c) contacting said metal surface with concentrated HNO₃.

3. A process according to claim 1 wherein said polyamine compound is triethylenetetramine.

4. A process according to claim 1 wherein said poly(arylene sulfide) compound is poly(phenylene sulfide).

5. A process for removing deposits on metal surfaces derived from poly(arylene sulfide) compound consisting essentially of contacting said metal surface with at least one polyamine compound represented by the general formula

$$R_1R_2N(CH_2)_x[N(CH_2)_x]_nNR_1R_2$$

wherein $R_1$ and $R_2$ can be hydrogen or any alkyl radical having from 1 to 10 carbon atoms; $R_3$ can be hydrogen or any alkyl radical having 1 to 6 carbon atoms; x can be 1, 2, or 3, and n can be any integer from 1 to 4, at a temperature above about 200° C. for about 0.5 hours to 24 hours.

6. A process according to claim 5 wherein said metal surface is further treated by contacting the resulting metal surface with methanol and then water; (b) drying said metal surface; and (c) contacting said metal surface with concentrated HNO₃.

7. A process according to claim 5 at a temperature above about 250° C.

8. A process according to claim 5 wherein said polyamine compound is triethylenetetramine.

9. A process according to claim 5 wherein said poly(arylene sulfide) compound is poly(phenylene sulfide).

* * * * *